Sept. 14, 1965    K. E. JOHNSON ETAL    3,205,639
ADSORPTION APPARATUS AND METHOD FOR DRYING GAS STREAMS
HAVING DIFFERENTIAL PRESSURE CONTROL MECHANISM FOR
VESSELS ON ADSORBING AND DESORBING CYCLES
Filed Aug. 5, 1963    2 Sheets-Sheet 1

INVENTORS.
Karl E. Johnson
William W. Bodle
BY
Hovey, Schmidt, Johnson & Hovey
ATTORNEYS.

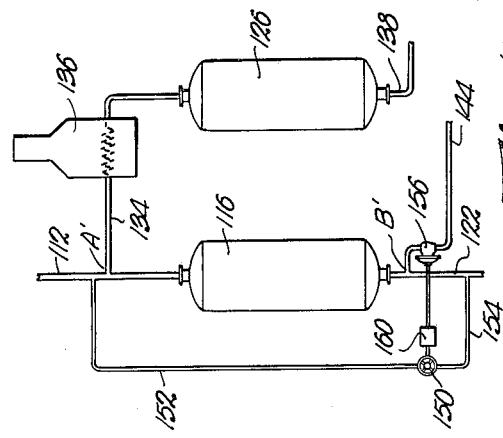
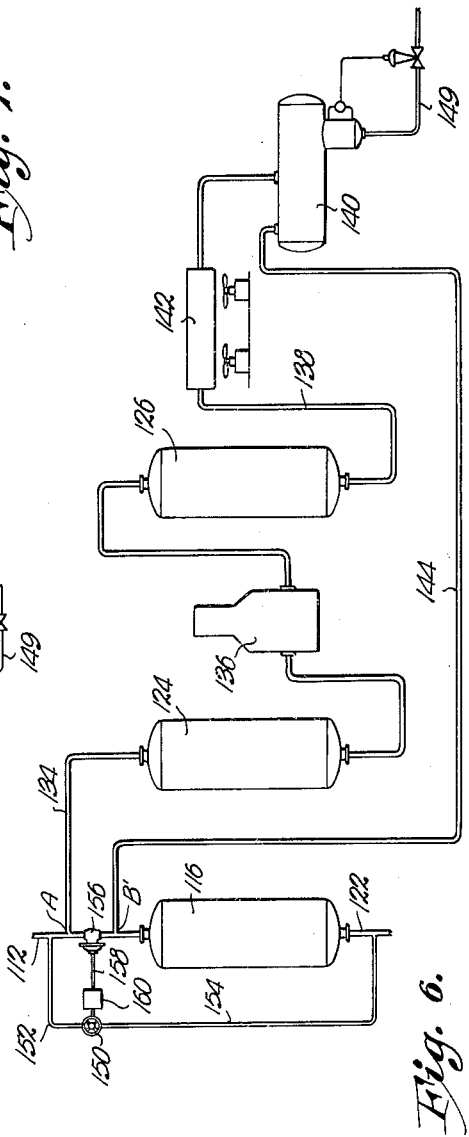
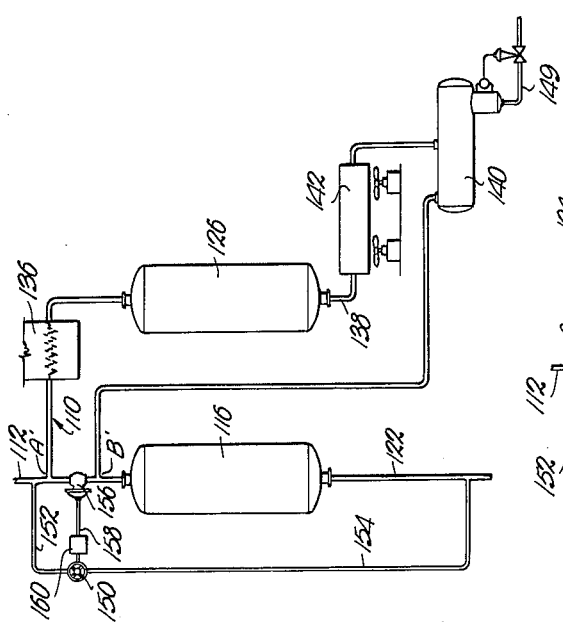

United States Patent Office 3,205,639
Patented Sept. 14, 1965

3,205,639
ADSORPTION APPARATUS AND METHOD FOR DRYING GAS STREAMS HAVING DIFFERENTIAL PRESSURE CONTROL MECHANISM FOR VESSELS ON ADSORBING AND DESORBING CYCLES
Karl E. Johnson, Prairie Village, Kans., and William W. Bodle, Deerfield, Ill., assignors to J. F. Pritchard and Company, Kansas City, Mo., a corporation of Missouri
Filed Aug. 5, 1963, Ser. No. 299,762
20 Claims. (Cl. 55—21)

This is a continuation-in-part of application Serial Number 260,680, filed February 25, 1963, now abandoned.

This invention relates to adsorption apparatus and method for treating gas streams and particularly to novel structure for obtaining most efficient heating or cooling of one of the adsorber beds simultaneously with treatment of the main gas stream wherein a portion of gas is passed throufh a previously regenerated adsorber bed.

Adsorption systems have been used for many years to remove components such as water and hydrocarbons from a gas stream in the nature of natural gas, with the feed gas stream, commonly referred to as wet gas, being passed through a regenerated adsorbent bed to effect removal of certain components, even in vapor form, from the gas. In order to permit removal of components from the gas on a continuous basis, it is conventional procedure to employ a number of beds of adsorbent operated in cyclic relationship. Thus, after loading of one adsorbent bed with adsorbed components, this adsorber is then placed on a regeneration cycle wherein a hot fluid is directed through the adsorbent material to displace the adsorbed components therefrom. The regenerant fluid containing the now desorbed components is then directed through suitable condensing structure where the desorbed components are condensed and removed, and the regenerant then returned to a suitable source of heat for raising the temperature thereof to the required regeneration level. In order to obtain most efficient utilization of the adsorbent beds, it has been found desirable to pass a relatively cool gas through the freshly regenerated adsorbent bed, in order to lower the temperature thereof as rapidly as possible, so that the bed may be placed back on a full adsorbing cycle.

In order to maintain the cost of the equipment at a minimum, and to make most efficient utilization of the gas available for treatment purposes, it has been found economical to employ a portion of the main wet gas stream to cool the freshly regenerated adsorbent bed down to the temperature of the gas stream at the inlet side thereof. However, diversion of a portion of the main wet gas stream through a freshly regenerated and therefore hot adsorbent bed, causes a very large pressure drop in the gas stream as the same flows through the hot adsorber. Although this pressure drop decreases as the bed cools, the amount of gas which can be passed through the hot adsorbent material is limited by the allowable pressure drop and therefore an extended period of time is required in which to effect full cooling of the adsorbent material.

Another problem which must be solved and which is encountered during removal of components from the wet gas stream, relates to specifications usually established by the operators of the treatment facility limiting the pressure drop across such facility to a maximum value. As an example only, it would not be unusual for a gas transmission company to supply natural gas to the treatment facility at a pressure of about 650 p.s.i.g. and require that the supplier of the treatment facility construct the equipment so that the pressure drop across the facility would not exceed 15 to 20 p.s.i. In order to avoid exceeding the pressure drop specified, it normally is necessary to establish the rate of flow of gas through the bed being heated or cooled, at a value such that the pressure drop across the bed will not materially affect the pressure drop across the entire facility. This means that when the bed is cool, a greater quantity of gas can flow through the adsorber without altering the over-all pressure drop across the facility, but heretofore there has been no provision for controlling the flow of gas through the bed being heated or cooled at all times during the regeneration cycle, without significantly altering the pressure drop across the entire treating facility.

It is therefore the primary object of the present invention to overcome the problems referred to above, by the provision of novel equipment components on the treatment facility, for maintaining the pressure drop across the treatment facility at a specified level, but with a maximum quantity of gas being directed through the adsorber bed on the heating or cooling cycle, to permit most efficient utilization of the apparatus and critical sizing of the equipment components for all conditions of operation of the treating facility.

It is another very important object of the invention to provide structure as defined above which includes a variable flow control valve located in disposition to control flow of gas through the bed in adsorbing service, and with pressure sensing structure being operably coupled to the main wet gas line as well as the main dry gas line, to determine the pressure differential therebetween, so that a pressure differential controller, operably connected to and controlled by the pressure sensing structure, can be used to open and close the variable flow control valve, as required to maintain a predetermined pressure drop across the entire treating facility.

Another important object of the invention is to provide control structure for an adsorption system of the type set forth above, wherein the equipment components are operable to direct a maximum quantity of heating or cooling gas through the adsorber bed at all times, within the pressure drop specifications, to permit heating or cooling of the bed in a minimum of time, thereby materially increasing the effectiveness of the apparatus, and permitting utilization of all of the equipment components at maximum efficiency.

It is a still further important aim of the invention to provide an improved adsorption method of removing components from a wet gas stream, wherein a preselected pressure differential is maintained between the wet gas stream inlet and the dried gas stream outlet under all conditions of operation, by varying the quantity of gas flowing through the bed on adsorption, as dictated by the pressure drop across the bed being heated or cooled by a stream of wet gas diverted from the main wet gas line.

In the drawings:
FIGURE 1 is a schematic representation of a portion of one type of adsorption apparatus utilizable to remove components from natural gas, and illustrating the novel structure of the present invention for maintaining a constant pressure drop across the treatment facility;

FIG. 5 is a schematic representation of another type of adsorption apparatus utilizable to remove components from natural gas, the apparatus including a regeneration circuit coupled directly with the main wet gas line for obtaining the regenerating fluid therefrom;

FIG. 6 is a schematic representation similar to FIG. 5, but illustrating an additional adsorber unit coupled in series with the other components in the regeneration circuit; and FIG. 7 is a fragmentary, schematic view similar to FIG. 5, but illustrating structure placing the regeneration circuit in fluid communication with both the main wet and dry gas supply lines, the variable flow control valve being shown in another alternate location thereof.

Figure 1:
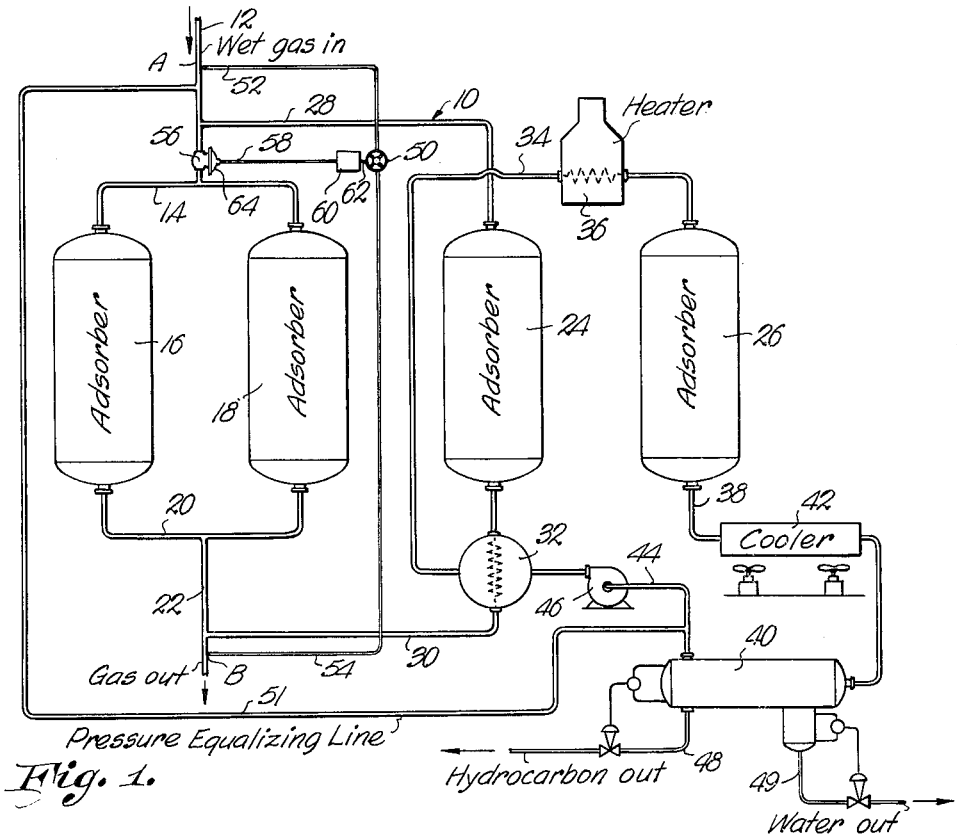

The apparatus broadly designated 10 in FIG. 1 of the drawings, is a schematic representation of equipment suitable for removing water and hydrocarbons from a wet natural gas stream by an adsorption process. For purposes of the present disclosure, only four adsorber vessels have been shown in the apparatus illustrated in FIG. 1, but it is to be understood that any number of these adsorption units may be employed, depending on the gas capacity required and the size of equipment which can be accommodated in the available space. Also, the utilization of four adsorber beds permits more efficient and economical use of equipment, but it is to be appreciated that the system is operable with a lesser number of adsorbers and could in fact be operated continuously with dependable results with only two adsorber vessels.

In the representative apparatus illustrated in FIGS. 1–4, the main wet gas line 12 is connected to a header conduit 14 in turn joined to the upper extremities of adsorber vessels 16 and 18. A manifold conduit 20 joins the lower extremities of vessels 16 and 18 to the main dry gas line 22. It is to be pointed out that the schematic diagram illustrated is for purposes of illustration only to show the apparatus in its most elementary form, and in actual practice, the conduits 14 and 20 would be connected to all of the adsorbers and suitable valves provided for selective direction of gas streams through the individual adsorbers. For purposes of this description, it is therefore assumed that the adsorber vessel 24 has been freshly regenerated and is therefore on a cooling cycle, while the adsorbent material in adsorber vessel 26 is being regenerated. Conduit 28 couples the upper extremity of vessel 24 to line 12, while conduit 30 extends from the lower extremity of vessel 24 to dry gas line 22. Conduit 30 passes through a heat exchanger 32 below vessel 24 in FIG. 1.

The regeneration circuit for vessel 26 is illustrated schematically as including a conduit 34 extending from heat exchanger 32 to the upper extremity of adsorber vessel 26, and having a heater 36 therein for raising the temperature of the regeneration gas to a selected level. Conduit 38 extends from the lower extremity of vessel 26 to a conventional separator 40 and has a cooler 42 interposed therein for lowering the temperature of the fluid to a level to condense the components in the fluid and which have been displaced from the adsorbent medium in vessel 26. The fluid conduit 44 leading from separator 40 to heat exchanger 32, has a compressor 46 therein for circulating the regeneration fluid through the circuit therefor. Hydrocarbons and water are removed from separator 40 via lines 48 and 49 respectively. The pressure equalizing line 51 serves to maintain the pressure of the fluid in the regeneration circuit substantially at the pressure of the gas in line 12.

As explained with respect to the vessels 16 and 18 on the adsorption cycle, the conduits 28, 30 and 34 are all connected to the individual adsorber vessels and suitable valves employed to control the flow passage of the gas through the various vessels. The schematic representation in FIG. 1 is therefore, a showing of the relationship of the equipment components during one cycle of operation of the equipment. Furthermore, the flow configuration illustrated in FIG. 1 and described thus far, is conventional in gas treating apparatus.

The novel subject matter of the present invention, and which is especially adapted for utilization on apparatus such as shown in FIG. 1, includes pressure sensing structure 50 and which may be identified as either a diaphragm or bellows type differential pressure transmitter of conventional design per se. One chamber of the structure 50 is fluid communication with the main gas line 12 through the medium of line 52 while the other chamber of structure 50 communicates with line 22 via line 54. It is to be noted that line 52 is connected to main wet gas line 12 upstream of conduit 28, while the line 54 is joined to main dry gas line 22 downstream of conduit 30. A variable orifice flow control valve 56 is interposed in main wet gas line 12 between header conduit 14 and conduit 28, and is operably connected to a fluid conduit 58 extending from the differential pressure controller 60. Line 62 joins pressure sensing structure 50 to the controller 60. Although the components illustrated in FIG. 1 are primarily adapted for pneumatic operation, it is to be recognized that electrically or mechanically operable units are utilizable with equal facility for the present application. The controller 60 opens and closes the valve element in the body of valve 56 through a fluid directed into the chamber 64 of valve 56. A spring controlled diaphragm in chamber 64 and responsive to pressure thereagainst, shifts the valve element within the body of valve 56 toward or away from the closed position with respect to the valve seat in the valve body, depending on the pressure in chamber 64 as governed by controller 60 actuated by structure 50.

In describing the operation of apparatus 10, it is apparent that for a basic understanding of the principles of the present structure it is only necessary that one cycle of operation of the equipment components be considered. Therefore, it can be seen that the wet gas stream flowing in line 12 is directed into the paralleled adsorber vessels 16 and 18 via header conduit 14. The adsorption medium in adsorbers 16 and 18 removes components from the natural gas, whereby the dry gas leaving the lower extremities of the vessels 16 and 18, is introduced into the main dry gas line 22 by the manifold conduit 20.

Simultaneously with drying of the main gas stream flowing through adsorber vessels 16 and 18, a predetermined portion of the wet gas from line 12 is diverted therefrom via conduit 28 and introduced into the upper extremity of adsorber vessel 24. In accordance with the present assumption, the adsorbent material in vessel 24 has just undergone regeneration and therefore, is in a hot condition. The gas stream diverted from line 12 is introduced into the adsorber vessel 24 to cool the adsorbent material therein, with the gas emanating from the lower extremity of vessel 24 being returned to the line 22 via conduit 30.

At this same time, the adsorbent material in vessel 26, which has previously been loaded with adsorbed components during a loading stage, is regenerated by gas flowing through the conduits 34, 38 and 44. Thus, the heated gas flowing from the heater 36 is directed into the adsorber vessel 26 to heat the adsorbent material therein to a level to purge all components from the adsorbent material to thereby reactivate the bed for use in a subsequent adsorbing cycle. The cooling and condensing units 42 and 40 remove the components from the gas stream so that the latter may be reused to desorb another loaded bed during cyclic operation of apparatus 10.

The gas diverted from line 12 into vessel 24 through conduit 28, encounters the hot adsorbent medium and the temperature of the coolant gas is immediately raised. The differential pressure sensing structure 50 cooperates with the controller 60 and the valve 56 to maintain a selected pressure drop across apparatus 10, notwithstanding the fact that the pressure drop of the gas across vessel 24 varies with the changes in the temperature of the adsorbent material making up the bed. The controller 60 connected to sensing structure 50 operates to open or close the valve element of valve 56 as necessary to maintain the preselected pressure differential between the points A and B on the gas lines 12 and 22 respectively. As the pressure drop between points A and B as sensed by structure 50 starts to increase, the controller 60 is operable to shift the valve element within valve 56 toward the fully open position thereof, while a decrease in the pressure drop across points A and B is sensed by controller 60 through the structure 50, thereby effecting shifting of the valve element within valve 56 toward the closed position of the same to increase the gas flow in adsorber vessel 24.

A definite amount of wet gas is flowing through the main wet gas line 12, and since the conduit 28 communicates directly with line 12, a specific proportion of the gas will flow into adsorber vessel 24. At the commencement of the cooling cycle, the adsorbent material in vessel 24 is hot, and therefore, the gas directed therethrough will expand in volume. For a given amount of gas passing through the adsorbent material, the pressure drop of the gas will be higher than if the bed were at a lower temperature. For this reason, the quantity of gas that can be forced through the bed in vessel 24, is limited by the pressure drop permitted across the points A and B. Thus, at the beginning of the cooling cycle, less gas can be directed through vessel 24 than is the case toward the end of the cooling period when the temperature drops and the volume of the gas shrinks. As an example only, if gas at a flow rate represented by the value 100 may pass through the hot adsorbent medium with a pressure drop of a prescribed value of 15, then gas at a flow rate represented by the value of 142 could be passed through the adsorber vessel when the temperature of the adsorbent medium had dropped to the level of the gas and with the pressure drop still being at 15. The novel control structure of the present invention permits automatic direction of a maximum amount of gas through the adsorber on cooling, so that the bed can be returned to the low temperature value in a minimum of time with a maximum amount of gas flowing through the vessel.

A certain number of pounds of gas are required to be passed through the bed being cooled as for example in vessel 24, in order to lower the temperature of the adsorbent medium to substantially the temperature of the gas in line 12, and therefore, if it was necessary to operate with a uniform flow of gas through the vessel being cooled, the pressure drop across the bed would vary with the temperature of the adsorbent medium. However, if there is a limitation on the total pressure drop across points A and B, then the equipment must be sized for the maximum pressure drop which can be permitted and resulting in a substantial waste of adsorbent and vessels. At the close of the cooling cycle, the plant will be operating at a lower pressure drop than specified, resulting in the utilization of much larger equipment than would be necessary if the pressure drop across points A and B can be adequately controlled. On the other hand, if an attempt is made to regulate the pressure drop by increasing the cooling period for the bed which has been freshly regenerated, it can be readily observed that the plant will require larger units to handle the volume of gas available at line 12 because of the correspondingly longer time the adsorbing vessels are in service and the increased amount of components that must be adsorbed.

The control apparatus of this invention however, maintains the proper pressure differential across points A and B regardless of the temperature of the bed undergoing cooling, because during the initial period of cooling the valve 56 opens to a greater extent to allow a greater proportion of the gas to flow through adsorbers 16 and 18, while progressive cooling of the adsorbent medium in vessel 24, results in progressive closing of the valve 56, so that additional amounts of the gas from line 12 are by-passed to the vessel 24 via conduit 28. This results in forcing of maximum amounts of gas through adsorber vessel 24 undergoing cooling, consistent with maintenance of the pressure drop between points A and B, at a stipulated value.

The details of construction of the controller 60, structure 50 and valve 56 may be varied depending on the type of devices employed, but in the preferred equipment, structure 50 is operable to sense the pressure in respective lines 12 and 22, and mechanically controls the differential pressure controller 60 which in turn reguates the setting of the valve 56 either pneumatically or electrically.

In a representative installation, the flow rate of natural gas through the adsorber being cooled at the initiation of the cooling cycle, may be of the order of 110,000 lbs. per hour, and with the final flow rate being about 142,000 lbs. per hour, giving an average flow of 126,000 lbs. per hour. The wet natural gas flowing in line 12 will normally have a temperature of the order of 80° F. while the heater 36 is operable to heat the gas directed into adsorber 26, to a level of about 600° F. This means that the adsorbent medium in the vessel 24 being cooled will have a temperature of about 600° F. and therefore requiring cooling down to about the temperature of the gas in line 12. However, since the bed temperature immediately after regeneration will be about 600° F. at the inlet side, and only about 450° F. at the outlet opening, during the cooling cycle, it normally is only necessary to direct sufficient cool gas through the bed to lower the temperature of the bed at the outlet to about 150° F., since the portion of the bed at the inlet will be at about the temperature of the gas in line 12. The remaining portion of the bed will then be cooled by gas diverted thereinto through a subsequent main adsorption cycle.

Figure 2:
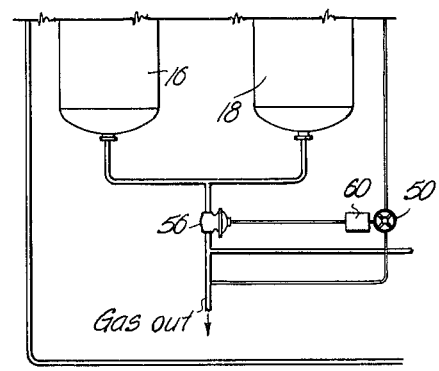
FIG. 2 is a fragmentary, schematic representation similar to FIG. 1, but illustrating the variable flow control valve in a second alternate location thereof.
Figure 3:
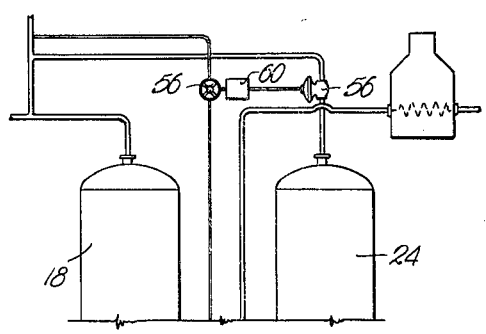
FIG. 3 is a fragmentary, schematic representation as illustrated in FIG. 1 and showing a third alternate location of the valve means controlled by the novel structure of this invention.
Figure 4:
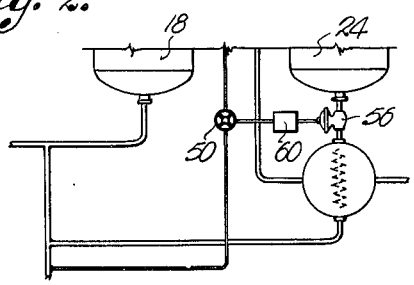
FIG. 4 is a fragmentary, schematic representation of apparatus as shown in FIG. 1, but illustrating a fourth alternate location of the main variable flow control valve.

In the alternate arrangements of valve 56 as illustrated in FIGS. 2, 3 and 4, the pressure drop across the system is regulated in the same manner as described above, with the exception that positive control over flow of gas through the adsorber vessel being cooled, is obtained by location of the control valve in a number of equivalent locations with reference to the adsorbent material undergoing cooling. It is to be understood however, that in the arrangement of valve 56 as shown in FIGS. 3 and 4, increase in the pressure drop between points A and B as sensed by structure 50, results in the controller 60 closing the valve element of valve 56 to restrict the rate of flow of gas through the adsorber 24 while a progressive decrease in the pressure drop as sensed by the structure 50 results in the controller 60 progressively opening the valve 56.

Another embodiment of apparatus for carrying out the principles of the instant invention is schematically illustrated in FIG. 5 of the drawings. The construction and operation of the various individual components of the apparatus are identical to those explained with respect to the apparatus shown in FIGS. 1–4, and, for the sake of brevity, will not be set forth again to an extent greater than that necessary in the description of the over-all apparatus to adequately convey an understanding of the invention.

It is to be understood that any number of adsorber vessels could be used with apparatus as shown in FIGS. 5–7, the units being cyclically connected with the other components. Thus, the drawings are intended to show the relationship of the equipment components during one cycle of operation of the equipment.

Referring initially to FIG. 5, apparatus 110 includes a main wet gas line 112 connected to the upper extremity of an adsorber vessel 116 from which the main dry gas line 122 emanates at the lower extremity thereof. It will be understood that vessel 116 contains adsorbing material which is in condition to remove the components from the wet gas.

A second adsorber vessel 126 is illustrated connected in a regeneraiton circuit which comprises a conduit 110 communicating at a first point A' with the main wet gas line 112. Conduit 134 passes through a heater 136 and is joined to the upper extremity of vessel 126 which contains a large amount of the component from the wet gas and is in condition to be regenerated. Conduit 138 extends from the lower extremity of vessel 126 to a separator 140, there being interposed a cooler 142 in conduit 138 for lowering the temperature of the fluid to the necessary level for condensing the components in the fluid which have been displaced from the adsorbent medium in vessel 126.

A fluid conduit 144 communicates separator 140 with the main wet gas supply line 112 at a second point designated B'. A line 149 is shown coupled with separator 140 for the purpose of removing water therefrom as is conventional. Pressure sensing structure 150 is coupled with the main wet gas line 112 upstream from point A' by line 152 and with the main dry gas line 122 by a line 154. The variable orifice flow control valve 156 is interposed in line 112 between points A' and B' and is in fluid communication with a differential pressure controller 160 by a fluid conduit 158.

In the operation of the apparatus illustrated in FIG. 5, the wet gas is directed into vessel 116 wherein the components are removed and the dry gas is taken off through line 122. A portion of the main wet gas stream, however, is diverted at point A' through the regeneration circuit wherein the temperature thereof is elevated in heater 136 for effectively regenerating the adsorber medium in vessel 126.

The regeneration fluid coming from vessel 126 has its temperature lowered in cooler 142 to facilitate the separation of the components from the fluid in separator 140 from which the regeneration fluid is fed back into the main wet gas stream at point B' downstream from valve 156. The pressure sensing structure comprising lines 152 and 154 communicating with the wet gas supply line 112 and the dry gas line 122 respectively, maintains constant vigilance to determine the pressure drop across the system. The control structure 150 operating through controller 160 to regulate valve 156 in the manner heretofore described, varies the orifice of valve 156 to control the quantity of fluid which is diverted into the regeneration circuit through conduit 134. Thus, the variations in the pressure drop effected by the constantly changing temperature in the regeneration circuit is automatically compensated for to maintain a constant pressure drop across the entire system.

The apparatus shown in FIG. 6 differs from that of FIG. 5 only in that an additional adsorber vessel 124 is connected in series in conduit 134 between point A' and the heater 136. It will be understood that vessel 124 contains an adsorbing medium which has just been regenerated, is therefore, very hot and requires cooling prior to it being cyclically coupled into the main wet gas supply line 112 for removing the component from the gas.

The apparatus illustrated fragmentarily in FIG. 7 is similar to that of FIG. 5 with the exception that point B' at which fluid conduit 144 empties the regeneration fluid into the main gas line, is at a point downstream from vessel 116 and is in the main dry gas line 122. Additionally, it will be noted that the variable orifice flow control valve 156 is in conduit 144 upstream in the regeneration circuit from point B'.

In the operation of the apparatus of FIG. 7, it is possible to control that portion of the wet gas stream which is diverted into conduit 134 for the regeneration circuit by varying the amount of gas which is permitted to flow through conduit 144 and empty into the main dry gas line 122. This is because there is a certain amount of flow resistance in vessel 116 which has a natural tendency to direct the gas into conduit 134 at point A', the quantity thereof being governed directly by the amount of gas which can flow through the circuit. This, in turn, is regulated by valve 156 in the location illustrated in FIG. 7.

Having thus described the invention, what is claimed as new and desired to be secured by Letters Patent is:

1. Adsorption apparatus for removing a component from a wet gas stream comprising:
   a main wet gas line;
   a main dry gas line;
   at least three units having an agent therein capable of removing said component from the gas;
   a regenerating system for heating a fluid regenerant for said agent;
   conduit means operably coupled to said main gas lines, the units and said system for cyclically (a) directing a portion of the wet gas from said main wet gas line through a first unit, (b) directing the hot regenerating fluid from said system through a second unit containing a quantity of said agent which has previously been loaded with said component, and (c) removing another portion of wet gas from the main wet gas line at a first point, passing said other portion of gas through a third freshly regenerated unit to cool the agent therein, and then reintroducing said other portion of gas into said main dry gas line at a second point;
   structure connected to said main wet gas line upstream of said first point and to said main dry gas line downstream of said second point for sensing the pressure differential between the gas streams in respective main gas lines;
   variable valve means operably associated with said conduit means for varying the quantity of gas permitted to flow through said first unit; and
   control means coupled to said structure and the variable valve means for varying the latter in response to variation of the pressure differential between the gas in said main wet gas line and the main dry gas line sensed by said structure to maintain a preselected pressure drop between said first and second points.

2. Apparatus as set forth in claim 1 wherein said variable valve means is located in the conduit leading from the main wet gas line to the first unit and downstream of said first point.

3. Apparatus as set forth in claim 1 wherein said valve means is located in the conduit extending from the first unit to the main dry gas line and positioned upstream of said second point.

4. Apparatus as set forth in claim 1 wherein said valve means is located in the conduit extending from the main wet gas line to the third unit.

5. Apparatus as set forth in claim 1 wherein said valve means is located in the conduit extending from the third unit to the main dry gas line.

6. Apparatus as set forth in claim 1 wherein said control means includes a differential pressure device operably coupled to said structure and to the valve means for altering the setting of the valve means in direct response to variations in the pressure difference between the gas in said main wet gas line and said main dry gas line as sensed by said structure.

7. Apparatus as set forth in claim 6 wherein said structure includes a pressure operated differential transmitter operably coupled to said device for operating the latter.

8. Apparatus as set forth in claim 7 wherein said device is operable to change the setting of the valve means to decrease the flow rate of gas therethrough as the differential pressure sensed by the structure decreases and alters the setting of the valve means to permit a greater flow rate of gas therethrough in response to increase of the differential pressure sensed by said structure.

9. Apparatus as set forth in claim 1 wherein a pair of first units are provided between said main wet gas line and said main dry gas line in parallel flow relationship to said third unit.

10. In adsorption apparatus for removing a component from a wet gas stream wherein is provided a main wet gas line and a main dry gas line, at least three units having an agent therein capable of removing said component from the gas, a regeneration system for heating a fluid regenerant for said agent, and conduit means operably coupled to said main lines, the units and said system for cyclically directing a portion of the wet gas from said main wet gas line through a first unit, for directing the hot regenerating fluid from said system through a second unit containing a quantity of said agent which has previously been loaded with said component, and for removing another portion of wet gas from the main wet gas line at a first point, passing said other portion of gas through a third freshly regenerated unit to cool the agent therein, and then reintroducing said other portion of the gas into said main dry gas line at a second point, the improvement of which comprises:

structure operably connected to said main wet gas line upstream of said first point and to said main dry gas line downstream of said second point for sensing the pressure differential between the gas streams in respective main gas lines;

variable valve means operably associated with said conduit means for varying the quantity of gas permitted to flow through said first unit; and control means coupled to said structure and the variable valve means for varying the latter in response to variation of the pressure differential between the gas in said main wet gas line and the gas in the main dry gas line sensed by said structure, to maintain a preselected pressure drop between said first and second points.

11. In a cyclic method of removing a component from a wet gas stream wherein a substantial portion of the wet gas stream is passed through a first drying agent for the component, a hot regenerating fluid is passed through a second drying agent previously loaded with said component, and another portion of the wet gas is removed from the wet gas line at a point upstream of said first drying agent, directed through a third freshly regenerated drying agent to cool the latter, and then reintroduced into the dry gas leaving said first drying agent at a point downstream of the same, the improved steps comprising:

sensing the pressure of the wet gas upstream at the point of removal of said other portion of gas therefrom;

sensing the pressure of the dry gas downstream from the point of reintroduction of said other portion of gas into the dry gas leaving said first drying agent; and maintaining a preselected pressure differential between said points by varying the quantity of gas flowing through said first drying agent in accordance with the pressure drop across said third drying agent.

12. A method as set forth in claim 11 wherein the preselected pressure differential between said points is maintained by selectively varying the flow rate of wet gas into the first drying agent.

13. A method as set forth in claim 11 wherein the preselected pressure differential between said points is maintained by selectively varying the flow rate of dry gas emanating from the first drying agent.

14. A method as set forth in claim 11 wherein the preselected pressure differential between said points is maintained by selectively varying the flow rate of wet gas into the third drying agent.

15. A method as set forth in claim 11 wherein the preselected pressure differential between said points is maintained by selectively varying the flow rate of dry gas emanating from the third drying agent.

16. Adsorption apparatus for removing a component from a wet gas stream comprising:

main gas line means including a main wet gas line and a main dry gas line;

a plurality of units having an agent therein capable of removing said component from the gas;

a regeneration system for heating a fluid regenerant for said agent;

conduit means operably coupled to said main gas lines, the units and said system for cyclically (a) directing a portion of the wet gas from said main wet gas line through a first unit, and (b) directing the hot regenerating fluid from said system through a second unit containing a quantity of said agent which has previously been loaded with said component, said conduit means including means for removing another portion of the gas from said main wet gas line at a first point and then reintroducing said other portion of gas into said main gas line means at a second point;

structure connected to said main wet gas line upstream of said first point and to said main dry gas line downstream of said second point for sensing the pressure differential between the gas streams in respective main gas lines;

variable valve means operably associated with said conduit means for varying the quantity of gas permitted to flow through said first unit; and control means coupled to said structure and the variable valve means for varying the latter in response to variation of the pressure differential between the gas in said main wet gas line and the main dry gas line sensed by said structure to maintain a preselected pressure drop between said main wet and dry gas lines.

17. Adsorption apparatus for removing a component from a wet gas stream comprising:

main gas line means including a main wet gas line and a main dry gas line;

a plurality of units having an agent therein capable of removing said component from the gas;

a regeneration system for heating a fluid regenerant for said agent, said system being operably coupled with the main gas line means for removing a portion of the gas from the main wet gas line at a first point and reintroducing the gas into the main line means at a second point;

conduit means operably coupled to said main gas lines, the units and said system for cyclically (a) directing another portion of the wet gas from said main wet gas line through a first unit, and (b) directing the hot regenerating fluid from said system through a second unit containing a quantity of said agent which has previously been loaded with said component;

structure connected to said main wet gas line upstream of said first point and to said main dry gas line downstream of said second point for sensing the pressure differential between the gas streams in respective main gas lines;

variable valve means operably associated with said conduit means for varying the quantity of gas permitted to flow through said first unit; and control means coupled to said structure and the variable valve means for varying the latter in response to variation of the pressure differential between the gas in said main wet gas line and the main dry gas line sensed by said structure to maintain a preselected pressure drop between said main wet and dry gas lines.

18. Apparatus as set forth in claim 17, wherein said second point is in the main wet gas line downstream from said first point, said variable valve means being in the main wet gas line between said first and second points.

19. Apparatus as set forth in claim 17, wherein is included a freshly regenerated unit operably coupled with said conduit means between the system and the main wet gas line, the conduit means cyclically directing said other portion of the wet gas into said freshly regenerated unit for cooling the latter.

20. Apparatus as set forth in claim 17, wherein said second point is in the main dry gas stream, the variable valve means being in said conduit means between said first and second points.

References Cited by the Examiner
UNITED STATES PATENTS 2,957,544  10/60  Baker ---------------- 55—33 X
3,124,438  3/64   Lavery --------------- 55—33 X

OTHER REFERENCES

"Vapor Phase Adsorption in Gas Processing," by W. M. Dow, Advances in Petroleum Chemistry and Refining, vol. IV, pages 93–97, November 1961.

REUBEN FRIEDMAN, *Primary Examiner.*